United States Patent
Bai

(10) Patent No.: US 9,792,297 B2
(45) Date of Patent: *Oct. 17, 2017

(54) FILE FOLDER TRANSMISSION ON NETWORK

(71) Applicant: Alibaba Group Holding Limited, Grand Cayman (KY)

(72) Inventor: Zhenguo Bai, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 14/812,162

(22) Filed: Jul. 29, 2015

(65) Prior Publication Data

US 2016/0019235 A1    Jan. 21, 2016

Related U.S. Application Data

(63) Continuation of application No. 13/916,856, filed on Jun. 13, 2013, now Pat. No. 9,128,952, which is a
(Continued)

(30) Foreign Application Priority Data

Mar. 28, 2008    (CN) .......................... 2008 1 0084253

(51) Int. Cl.
*G06F 15/16* (2006.01)
*G06F 17/30* (2006.01)
(Continued)

(52) U.S. Cl.
CPC ........ *G06F 17/30194* (2013.01); *H04L 51/04* (2013.01); *H04L 51/046* (2013.01);
(Continued)

(58) Field of Classification Search
CPC ..... H04L 63/0428; H04L 67/22; H04L 51/08; H04L 65/60; G06F 15/16; G06F 3/0605; G06F 17/30244
(Continued)

(56) References Cited

U.S. PATENT DOCUMENTS 6,668,276 B1    12/2003  Ohkado et al.
6,765,868 B1     7/2004  Dunn et al.
(Continued)

FOREIGN PATENT DOCUMENTS

CN    1609858 A     4/2005
CN   17220731 A     1/2006
(Continued)

OTHER PUBLICATIONS

Trapani, "Free Ways to Synchronize Folders Between Computers," lifehacker, posted on the Internet at <<http://lifehacker.com/372175/free-ways-to-synchronize-folders-between-computers>> Mar. 26, 2008.
(Continued)

*Primary Examiner* — Tesfay Yohannes
(74) *Attorney, Agent, or Firm* — Lee & Hayes, PLLC

(57) ABSTRACT

Disclosed are a method and a system for transmitting a file folder from the sending end to the receiving end. The system uses a file folder transmission unit at the sending end side to generate a directory structure file of the file folder. The directory structure file may have properties such as the size of the file folder, paths and path lengths of the files in the file folder. The sending end then sends the directory structure file to the receiving end through the file folder transmission unit to allow the system to determine which files in the file folder need to be transmitted. The needed files in the file folder are then transmitted to the receiving end according to the determination. The sending end and the receiving end
(Continued)

may communicate using an instant messaging tool. The disclosed method and system allow a faster and more convenient file folder network transmission.

15 Claims, 7 Drawing Sheets

Related U.S. Application Data continuation of application No. 13/675,580, filed on Nov. 13, 2012, now Pat. No. 8,510,401, which is a continuation of application No. 12/600,449, filed as application No. PCT/US2009/038774 on Mar. 30, 2009, now Pat. No. 8,359,358.

(51) Int. Cl.
    *H04L 29/08* (2006.01)
    *H04L 12/58* (2006.01)
(52) U.S. Cl.
    CPC .............. *H04L 51/08* (2013.01); *H04L 67/06* (2013.01); *H04L 69/329* (2013.01)
(58) Field of Classification Search
    USPC ........................................ 709/206, 219, 231
    See application file for complete search history.

(56) References Cited

U.S. PATENT DOCUMENTS

| | | | |
|---|---|---|---|
| 6,789,090 B1 | 9/2004 | Miyake et al. | |
| 6,912,543 B2 | 6/2005 | Agulhon | |
| 6,938,039 B1 | 8/2005 | Bober et al. | |
| 6,947,985 B2 | 9/2005 | Hegli et al. | |
| 6,970,847 B1 | 11/2005 | Melen et al. | |
| 7,089,279 B1 | 8/2006 | Sakaguchi | |
| 7,136,901 B2 | 11/2006 | Chung et al. | |
| 7,216,114 B2 | 5/2007 | Hendricks | |
| 7,346,664 B2 | 3/2008 | Wong et al. | |
| 7,353,252 B1 | 4/2008 | Yang et al. | |
| 7,441,077 B2 | 10/2008 | Tan et al. | |
| 7,469,260 B2 | 12/2008 | Enko et al. | |
| 7,469,620 B2 | 12/2008 | Fagan | |
| 7,587,422 B2 | 9/2009 | Wong et al. | |
| 7,590,667 B2 | 9/2009 | Yasuda et al. | |
| 7,613,770 B2 | 11/2009 | Li | |
| 7,620,618 B2 | 11/2009 | Tsukamoto | |
| 7,627,733 B2* | 12/2009 | Sinclair | G06F 3/0613 365/232 |
| 7,627,898 B2 | 12/2009 | Beck et al. | |
| 7,779,034 B2 | 8/2010 | Pedersen et al. | |
| 7,779,077 B2 | 8/2010 | Cho | |
| 7,804,626 B2 | 9/2010 | Satoh et al. | |
| 7,822,595 B2 | 10/2010 | Brunet et al. | |
| 7,844,579 B2 | 11/2010 | Peterson et al. | |
| 7,937,393 B2 | 5/2011 | Prahlad et al. | |
| 8,078,686 B2 | 12/2011 | Sjoblom et al. | |
| 8,094,647 B2 | 1/2012 | Elliott et al. | |
| 8,266,136 B1 | 9/2012 | Pogde et al. | |
| 8,369,824 B2 | 2/2013 | Bakker et al. | |
| 8,442,479 B2 | 5/2013 | Bakker et al. | |
| 8,478,226 B2 | 7/2013 | Bakker et al. | |
| 8,819,243 B1 | 8/2014 | Cope et al. | |
| 8,868,687 B2 | 10/2014 | Drope | |
| 8,964,764 B2 | 2/2015 | Drope | |
| 2001/0021159 A1 | 9/2001 | Aratani | |
| 2001/0056469 A1 | 12/2001 | Oonuki | |
| 2002/0133491 A1 | 9/2002 | Sim et al. | |
| 2002/0152194 A1 | 10/2002 | Sathyanarayan | |
| 2003/0014477 A1 | 1/2003 | Oppenheimer et al. | |
| 2003/0132967 A1 | 7/2003 | Gangadharan | |
| 2004/0010567 A1* | 1/2004 | Moyer | G06F 3/1222 709/219 |
| 2004/0077362 A1* | 4/2004 | Chinomi | H04W 76/002 455/456.5 |
| 2004/0103156 A1 | 5/2004 | Quillen et al. | |
| 2004/0133550 A1 | 7/2004 | Okamura | |
| 2004/0199514 A1 | 10/2004 | Rosenblatt et al. | |
| 2004/0205152 A1 | 10/2004 | Yasuda et al. | |
| 2005/0091289 A1 | 4/2005 | Shappell et al. | |
| 2005/0131900 A1 | 6/2005 | Palliyll et al. | |
| 2005/0185823 A1 | 8/2005 | Brown et al. | |
| 2005/0198165 A1* | 9/2005 | Reddel | H04L 67/06 709/206 |
| 2005/0223073 A1 | 10/2005 | Malik | |
| 2006/0031560 A1 | 2/2006 | Warshavsky et al. | |
| 2006/0031673 A1 | 2/2006 | Beck et al. | |
| 2006/0095531 A1 | 5/2006 | Cho | |
| 2006/0129898 A1 | 6/2006 | Park et al. | |
| 2006/0149806 A1 | 7/2006 | Scott et al. | |
| 2006/0184673 A1 | 8/2006 | Liebman | |
| 2006/0248122 A1 | 11/2006 | Nikiel et al. | |
| 2007/0005707 A1 | 1/2007 | Teodosiu et al. | |
| 2007/0011167 A1 | 1/2007 | Krishnaprasad et al. | |
| 2007/0050624 A1 | 3/2007 | Lord et al. | |
| 2007/0100888 A1 | 5/2007 | Kim et al. | |
| 2007/0124737 A1 | 5/2007 | Wensley et al. | |
| 2007/0143490 A1* | 6/2007 | Gallou | H04L 29/06027 709/231 |
| 2007/0168431 A1 | 7/2007 | Lyle et al. | |
| 2007/0201864 A1* | 8/2007 | Shinkai | G11B 27/034 396/429 |
| 2007/0203917 A1 | 8/2007 | Du et al. | |
| 2007/0220021 A1* | 9/2007 | Kato | G06F 17/30017 |
| 2007/0244908 A1 | 10/2007 | Rajan | |
| 2007/0244987 A1 | 10/2007 | Pedersen et al. | |
| 2007/0245409 A1 | 10/2007 | Harris et al. | |
| 2007/0260643 A1 | 11/2007 | Borden et al. | |
| 2008/0013914 A1* | 1/2008 | Shinkai | H04N 5/77 386/224 |
| 2008/0033902 A1 | 2/2008 | Glaizel et al. | |
| 2008/0056456 A1* | 3/2008 | Erhart | H04L 29/06027 379/88.01 |
| 2008/0133610 A1 | 6/2008 | Jung et al. | |
| 2008/0147747 A1 | 6/2008 | Cardamore | |
| 2009/0037433 A1 | 2/2009 | Nakamura et al. | |
| 2009/0037519 A1 | 2/2009 | Young | |
| 2009/0106666 A1 | 4/2009 | Nomura | |
| 2009/0132548 A1 | 5/2009 | Kagawa et al. | |
| 2009/0198780 A1 | 8/2009 | Koch | |
| 2010/0050092 A1 | 2/2010 | Williams et al. | |
| 2010/0145774 A1 | 6/2010 | Veshnyakov et al. | |
| 2010/0211599 A1 | 8/2010 | Cao | |
| 2011/0029619 A1 | 2/2011 | Bai | |
| 2011/0113122 A1 | 5/2011 | Drope | |
| 2011/0128389 A1* | 6/2011 | Maeda | H04N 1/00204 348/207.1 |
| 2011/0145345 A1 | 6/2011 | Wysham | |
| 2011/0219397 A1 | 9/2011 | Drope | |
| 2011/0276637 A1 | 11/2011 | Thornton et al. | |
| 2012/0078845 A1 | 3/2012 | Kasbekar et al. | |
| 2012/0173629 A1 | 7/2012 | Drope | |
| 2012/0233652 A1 | 9/2012 | Drope | |
| 2013/0024425 A1 | 1/2013 | Huang et al. | |
| 2014/0013277 A1 | 1/2014 | Forlenza et al. | |
| 2015/0020093 A1 | 1/2015 | Drope | |
| 2015/0381705 A1 | 12/2015 | Tang et al. | |

FOREIGN PATENT DOCUMENTS

| | | |
|---|---|---|
| CN | 101014022 A | 8/2007 |
| CN | 101098310 A | 1/2008 |
| CN | 101106542 A | 1/2008 |
| CN | 101272311 A | 9/2008 |
| CN | 101547161 | 9/2009 |
| CN | 102025515 | 4/2011 |
| EP | 1513065 | 3/2005 |
| EP | 1526471 | 4/2005 |
| EP | 1763187 A1 | 3/2007 |
| JP | 01290046 A | 11/1989 |
| JP | H07248954 A | 9/1995 |

(56) References Cited

FOREIGN PATENT DOCUMENTS

| | | | |
|---|---|---|---|
| JP | 09179727 A | 7/1997 |
| JP | H10214240 A | 8/1998 |
| JP | 10-340048 A | 12/1998 |
| JP | H11232159 A | 8/1999 |
| JP | 2001117827 A | 4/2001 |
| JP | 2001290695 A | 10/2001 |
| JP | 2003218851 A | 7/2003 |
| JP | 2003330836 A | 11/2003 |
| JP | 2005128874 A | 5/2005 |
| JP | 2005129061 A | 5/2005 |
| JP | 2005182169 A | 7/2005 |
| JP | 2005251144 A | 9/2005 |
| JP | 2005301809 A | 10/2005 |
| JP | 2007004301 A | 1/2007 |
| JP | 2007140951 A | 6/2007 |
| JP | 2007312381 A | 11/2007 |
| JP | 2008210178 | 9/2008 |
| JP | 2010086326 | 4/2010 |
| WO | WO2007107069 A1 | 9/2007 |

OTHER PUBLICATIONS

Translated the Chinese Office Action mailed Mar. 12, 2012 for Chinese patent application No. 200810084253.6, a counterpart foreign application of U.S. Appl. No. 12/600,449, 7 pages.

Translated the Chinese Office Action mailed Apr. 14, 2011 for Chinese patent application No. 200810084253.6, a counterpart foreign application of U.S. Appl. No. 12/600,449, 7 pages.

Translated the Japanese Office Action mailed Mar. 17, 2015 for Japanese patent application No. 2014-046841, a counterpart foreign application of U.S. Appl. No. 12/600,449, 7 pages.

Translated the Japanese Office Action mailed Aug. 6, 2013 for Japanese patent application No. 2011-502130, a counterpart foreign application of U.S. Pat. No. 8,359,358, 6 pages.

Non-Final Office Action for U.S. Appl. No. 12/600,449, mailed on Oct. 26, 2011, Zhenguo Bai, "File Folder Transmission on Network," 16 pages.

Final Office Action for U.S. Appl. No. 12/600,449, mailed on Mar. 13, 2012, Zhenguo Bai, "File Folder Transmission on Network," 21 pages.

Sato, "File Publishing Server by CVSup and DVSync," UNIX User, vol. 13, No. 6, pp. 131 to 138, Softbank Publishing, Inc., Japan, Jun. 1, 2004.

The Extended European Search Report mailed Feb. 21, 2017 for European Patent Application No. 09723639.2, 6 pages.

Office Action for U.S. Appl. No. 14/848,918, mailed on Jun. 1, 2017, Jingxiong Tang, "Method and System of File Folder Transmission in Instant Messaging", 24 pages.

Translation of the Chinese office Action mailed Mar. 21, 2014 for Chinese patent application No. 201110045735.2, a counterpart application of U.S. Appl. No. 13/503,471, 8 pages.

The Extended European Search Report mailed Jul. 25, 2014 for European patent application No. 12789717.1, 6 pages.

Translated the Japanese Office Action mailed Dec. 22, 2015 for Japanese patent application No. 2013-555444, a counterpart foreign application of U.S. Pat. No. 9,154,542, 7 pages.

Final Office Action for U.S. Appl. No. 13/503,471, mailed on Feb. 23, 2015, Jingxiong Tang, "Method and System of File Folder Transmission in Instant Messaging", 19 pages.

Office action for U.S. Appl. No. 14/843,918, mailed on Jan. 25, 2017, Tang et al., "Method and System of File Folder Transmission in Instant Messaging", 27 pages.

Office Action for U.S. Appl. No. 13/503,471, mailed on Oct. 23, 2014, Jingxiong Tang, "Method and System of File Folder Transmission in Instant Messaging", 18 pages.

Office Action for U.S. Appl. No. 14/848,918, mailed on Oct. 27, 2015, Jingxiong Tang, "Method and System of File Folder Transmission in Instant Messaging", 18 pages.

Office action for U.S. Appl. No. 14/848,918, mailed on Apr. 4, 2016, Tang et al., "Method and System of File Folder Transmission in Instant Messaging", 22 pages.

Office action for U.S. Appl. No. 14/848,918, mailed on Aug. 11, 2016, Tang et ai., "Method and System of File Folder Transmission in Instant Messaging", 23 pages.

The PCT Search Report mailed May 30, 2012 for PCT application No. PCT/US12/24716, 8 pages.

Watanabe. "Remedial Classes for Network Basic Knowledge that You Hesitate to Ask—Challenge to Become Real Manager", Network World, IDG Japan, Inc., Japan, May 1, 2004, vol. 9, No. 5, pp. 164-170.

\* cited by examiner

FILE FOLDER TRANSMISSION ON NETWORK

RELATED APPLICATIONS

This application is a continuation of U.S. patent application Ser. No. 13/916,856 filed Jun. 13, 2013, which claims priority to U.S. patent application Ser. No. 13/675,580, filed on Nov. 13, 2012, which claims priority to U.S. patent application Ser. No. 12/600,449, filed on Nov. 16, 2009, which claims priority to US National Stage Application No. PCT/US2009/038774, filed Mar. 30, 2009, entitled "FILE FOLDER TRANSMISSION ON NETWORK," which claims priority from Chinese patent application No. 200810084253.6, filed Mar. 28, 2008, entitled "SYSTEM, APPARATUS AND METHOD FOR FILE FOLDER TRANSMISSION", which applications are hereby incorporated in their entirety by reference.

BACKGROUND ART

The present disclosure relates to communication field, and particularly to systems, apparatuses, and methods for file transmission on network using communication applications such as instant messaging systems.

Along with the development of the Internet, electronic information is shared by Internet users all over the world. People can obtain various kinds of information from the Internet at any time to the benefit of their learning and other aspects of the life. Certain Internet communication software and services (e.g., QQ and MSN) have become a part of Internet users' lives including work, learning and entertainment. Because Internet communication often requires transmitting a file, file transmission has become one of the most important applications in the Internet.

File transmission as a core application of Internet application is also supported by operating systems such as Windows. Mainstream operating systems such as Windows already have support for transmission of files and file folders by means of network sharing in their various versions. However, such file and file folder transmission can only be carried out efficiently within a local area network. At the same time, in order to satisfy needs of Internet users, instant messaging software applications have provided a more powerful file transmission function using P2P (peer to peer networking) and file relay technology to realize transmission of a file between any two ends or even multiple ends on the Internet. However, because the transmission of a file folder is more complicated, existing instant messaging software has so far not provided a function for file folder transmission.

In a practical application, an Internet user often needs to send all files under a specific file folder. Because existing instant messaging tools do not provide a function for fast and simple file folder transmission, the user usually completes the transmission of a file folder using one of the following approaches.

In a first approach, a sender selects a file folder to be sent, and zips all the files in the file folder using zip software. After zipping is completed, a single zip file is sent to the recipient. Upon receiving the zip file, the recipient unzips the file to recover the file folder.

In particular, a Chinese patent Application No. 200310112571.6 discloses a proxy system and a method for file transmission. The method disclosed therein allows a proxy server to download information from a FTP (File Transfer Protocol) server, and upload information to the FTP server, based on a user request sent from a client computer. As shown in FIG. 1, the file transmission proxy system includes a proxy server 101, multiple client computers 103, a network 104, and a FTP server 102. As shown in FIG. 2, the proxy server 201 (101) includes a transmission module 210, a compression module 211, a decompression module 212, and a connecting module 213. The transmission module 210 is used for transmitting information between a client computer 103 and the FTP server 102. The compression module 211 is used for compressing the information that is being sent to a client computer 103. The decompression module 212 is used for decompressing the information that is being sent to the FTP server 102. The connecting module 213 is used for connecting with the FTP server 102 according to a request from a user. Using the system disclosed therein can improve file transmission speed, and file transmission security.

By zipping and compressing files in a file folder before transmission, the above-disclosed system and method not only have fast transmission speed, but also have lower costs for technical implementation. However, for a file folder of large size, zipping and unzipping become time-consuming. This causes a large amount of CPU, hard disk and memory resources of a user computer to be occupied during the process, and a poor user experience.

In an alternative approach, the sender selects and sends files in a file folder one after one, and the recipient receives the files one by one until the transmission of all the files is completed. Although this transmission method does not require zipping and has a low cost for technical implementation, the user operations of both the sender and the recipient can be extremely tedious. A large amount of time and energy can be wasted if a file folder contains a large number of files. Moreover, the complexity of network environment for a user, and the uncertainty of the user operations in a transmission process (e.g., sudden Internet failure or wrong file selection by the user) have posed difficulties to this method. Furthermore, because the Windows operating system has a maximum limit of 260 letters for a directory length, if the depth of a sub-directory of a file folder being sent (i.e., the maximum path length of a file in the file folder) is exceedingly deep, a storage failure for a recipient will occur. If the network conditions of two file transmission ends are poor, frequent fluctuations of data transmission routes may terminate the connection, and cause difficulties in recovering previous transmission after re-connection.

SUMMARY

Disclosed are a method and a system for transmitting a file folder from the sending end to the receiving end. The method uses a file folder transmission unit at the sending end side to first generate a directory structure file of the file folder. The directory structure file may have properties such as the size of the file folder, paths and path lengths of the files in the file folder. The sending end then sends the directory structure file to the receiving end through the file folder transmission unit to allow the system to determine which files in the file folder need to be transmitted. The files are then transmitted to the receiving end according to the determination. The disclosed method and system allow a faster and more convenient file folder network transmission, and help to solve the problems of tedious operations and high resource occupancy inherent in existing file folder transmission methods.

The directory structure file may be generated by traversing the file folder and computing the properties of the directory structure file. The properties of the directory structure file may also include the size of a subfolder in the file folder and paths and path lengths of files in the subfolder.

In one embodiment, the files in the file folder that need to be transmitted may be determined by analyzing the directory structure file at the receiving end. The receiving end may send a file acquisition request to the sending end to request the files in the file folder that need to be transmitted.

In one embodiment, the sending end and they receive end communicate through an instant messaging tool. The sending end sends a file folder transmission request to the receiving end through an instant messaging channel. In order to transmit the files in the file folder, a network data transmission channel may be opened based on network condition between the sending end and a receiving end before sending the directory structure file from the sending end to the receiving end.

In one embodiment, the system determines whether the receiving end already has the directory structure file before transmitting the directory structure file. In order to do this, the system may generate an index identifier of the directory structure file, send the index identifier to the receiving end to determine whether the receiving end already has the directory structure file using the index identifier. The index identifier may be a 16-bit unique identifier extracted from the directory structure file using a message digest algorithm.

Upon an occurrence of a network connection interruption between the receiving end and the sending end, the method may acquire breakpoint information of transmission interruption of the directory structure file or the file folder, and resume the transmission from a position indicated by the breakpoint information after the transmission returns to normal.

One aspect of the present disclosure is an apparatus for transmitting a file folder between a sending end and a file folder transmission. The apparatus connects with the sending end, and the receiving end connects with the sending end through a network connection to transmit the file folder from the sending end through the file folder transmission device. The file folder transmission apparatus has a file folder directory management module adapted for generating a directory structure file of the file folder; a file folder transmission operation logic module adapted for determining files in the file folder that need to be transmitted from the sending end to the receiving according to the directory structure file; and any network transmission module adapted for transmitting the files in the file folder that need to be transmitted to the receiving end. The directory structure file having properties may include size of the file folder, paths and path lengths of files in the file folder.

In one embodiment, the file folder transmission operating logic module is further adapted for receiving a file acquisition request from the receiving end, the file acquisition request requesting the files in the file folder that need to be transmitted.

According to another aspect of the present disclosure, one or more computer readable media have stored thereupon a plurality of instructions that, when executed by a processor, causes the processor to generate a directory structure file of a file folder; send the directory structure file from a sending end to a receiving end; determine files in the file folder that need to be transmitted from the sending end to the receiving according to the directory structure file; and transmit the files in the file folder that need to be transmitted to the receiving end. In one embodiment, the processor determines the files in the file folder that need to be transmitted according to a file transmission request received from the receiving end.

The disclosed method uses a file folder transmission unit to manage file folder transmission, and requires only a simple one-click operation to achieve transmission of a file folder between a sending end and a receiving end. In addition to the easy and convenient operation in file folder transmission, the disclosed method also avoids drawback of high occupancy of system resources caused by zipping and compressing a file folder. Furthermore, the disclosed method and system may adopt a breakpoint transmission resume mechanism. In an environment having poor network conditions, or during a network interruption, the disclosed method and system allow a fast recovery to previous transmission status upon re-connection, resulting in a more stable and reliable file folder transmission.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

The method and system of file folder transmission are described in detail using accompanying figures.

Figure 1:
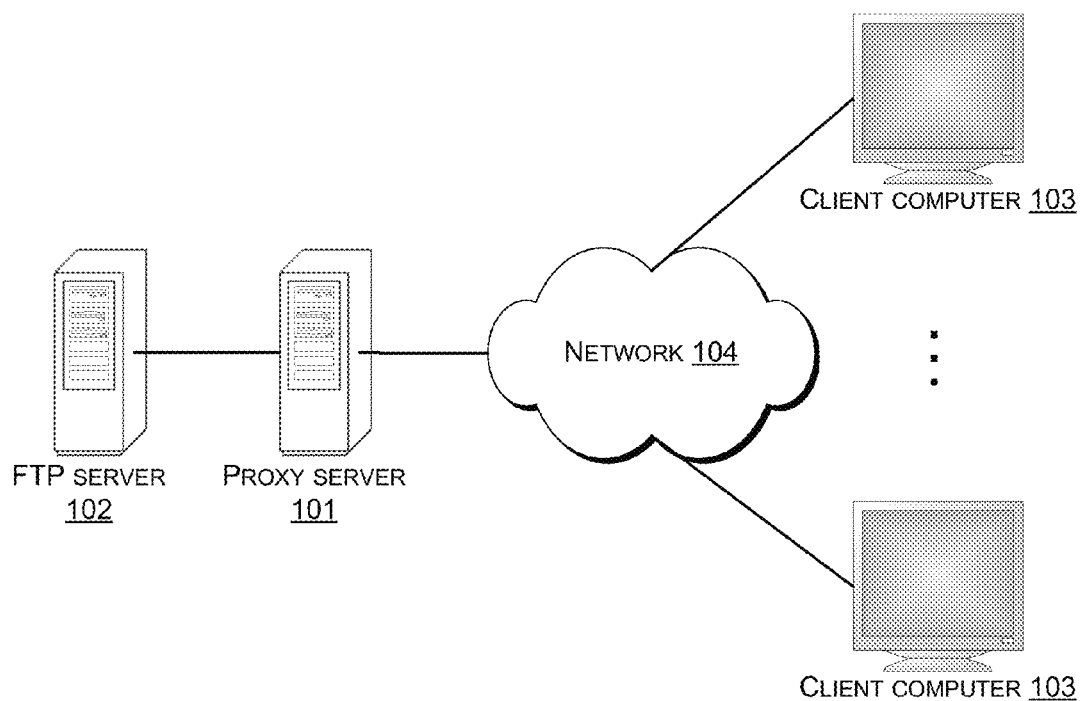
FIG. 1 shows a structural diagram of a prior art file folder transmission proxy system.
Figure 2:
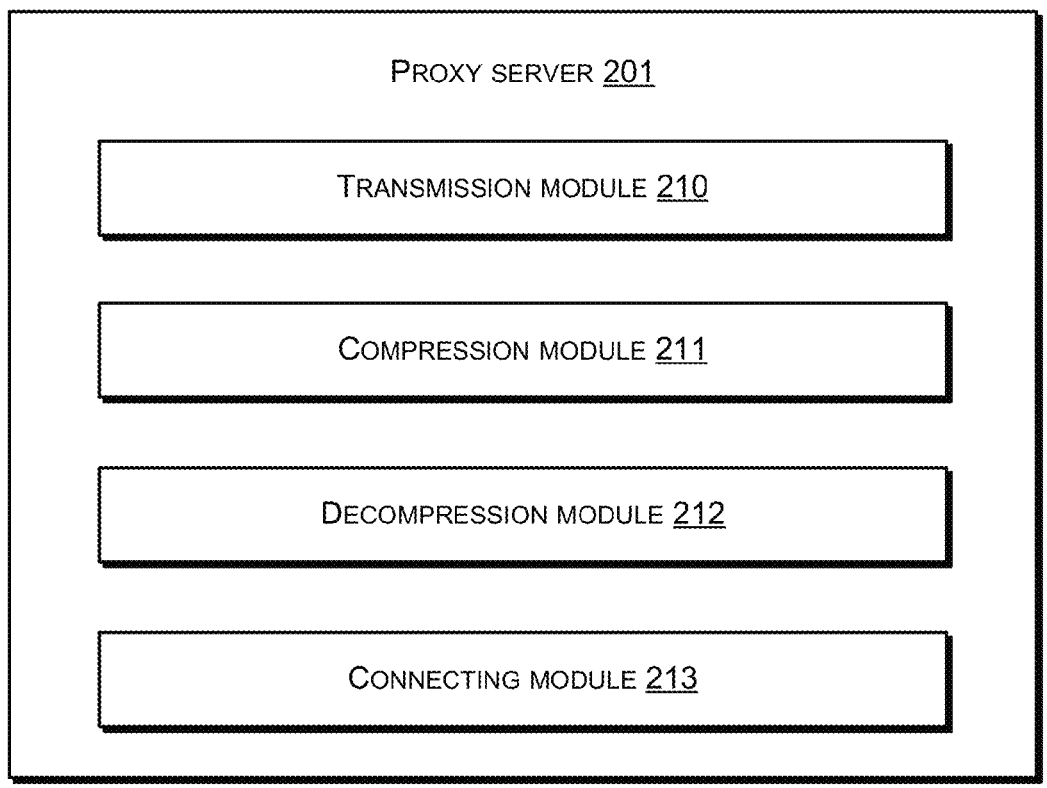
FIG. 2 shows a structural diagram of the proxy server of the prior art file folder transmission proxy system of FIG. 1.
Figure 3:
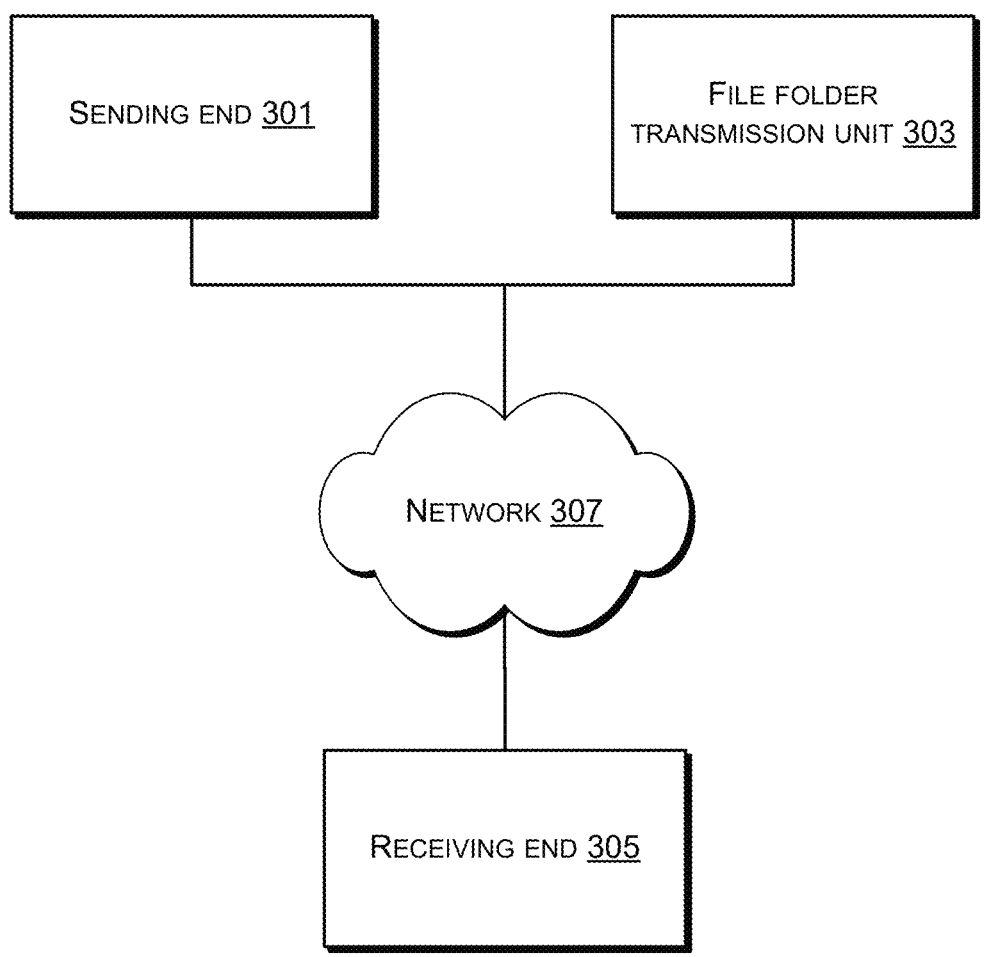
FIG. 3 shows a structural diagram of a file folder transmission system in accordance with an exemplary embodiment of the present disclosure.

FIG. 3 shows a structural diagram of a file folder transmission system in accordance with an exemplary embodiment of the present disclosure. The file folder transmission system 300 includes a sending end 301, a file folder transmission unit 303, and a receiving end 305. The file folder transmission unit 303 connects with the sending end 301, and connects with the receiving end 305 through a network 307.

The sending end 301 and the receiving end 305 may each be a user terminal such as a personal computer, a mobile device or a network client. The file folder transmission unit 303 may either be a standalone device, a server (or a component installed on the server), or a component (software, hardware or a combination thereof) installed on the same machine with the sending end 301. In one embodiment, the sending end 301 and/or the receiving end 205 each has an instant messaging client.

Figure 4:
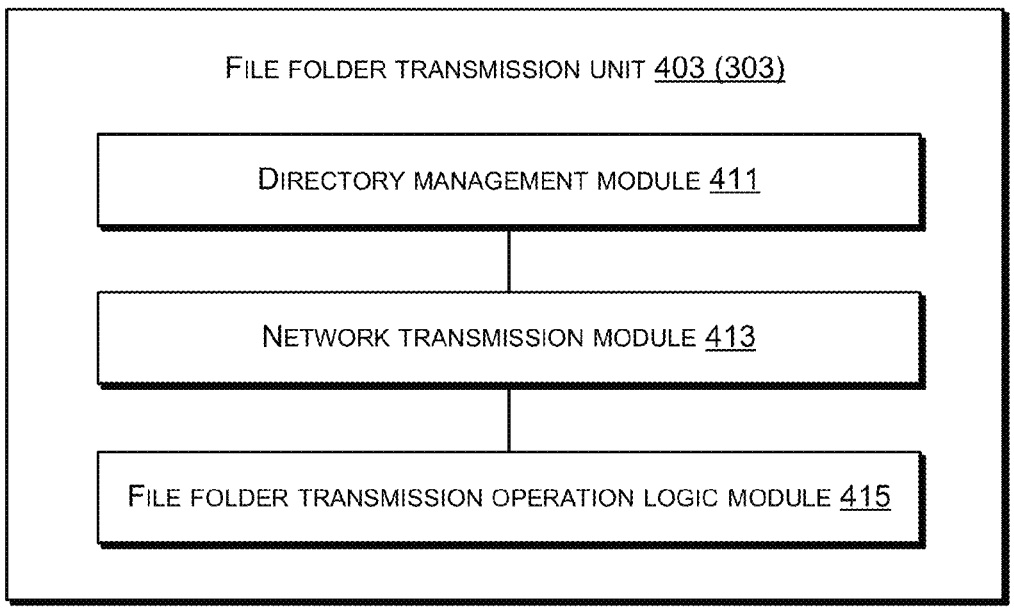
FIG. 4 shows a structural diagram of a file folder transmission unit in the exemplary file folder transmission system of FIG. 3.

FIG. 4 shows a structural diagram of a file folder transmission unit used in the exemplary file folder transmission system of FIG. 3. The file folder transmission unit 403 (303) includes a directory management module 411, a network transmission module 413, and a file folder transmission operation logic module 415. The directory management module 411 is used for generating a directory structure file of the file folder to be transmitted from the sending end 301. The directory structure file may include properties including size of the file folder, paths and path lengths of files in the file folder and similar information of subfolders. The directory management module 411 traverses files in the file folder and computes the properties of the directory structure file such as the space (size) on the hard disk to be occupied by the file folder (including the files contained therein), the path and the path length of sub-file folders and sub-files (files in a subfolder) in the file folder. The directory management module 411 then sends the directory structure file to the receiving end 305 through the sending end 301.

The network transmission module 413 is used for establishing a network data transmission channel based on network conditions of the sending end 301 and the receiving end 305. The file folder transmission operation logic module 415 is used for transmitting the files in the file folder to the receiving end 305 through the network data transmission channel.

In one embodiment, the file folder transmission unit 403 (303) determines which files in the file folder need to be transmitted from the sending end to the receiving. This may be done by receiving a file acquisition request sent from the receiving end 305. The file acquisition request specifies the files in the file folder that need to be transmitted. The receiving end 305 may determine the files that need to be transmitted by analyzing the directory structure file received in comparison with the files already stored at the receiving end 305.

It is noted that the file folder transmission unit 303 (403) can be implemented by either software or hardware, or a combination thereof, and may either be a stand-alone device or a component installed on the same machine with the sending end 301.

Figure 5:
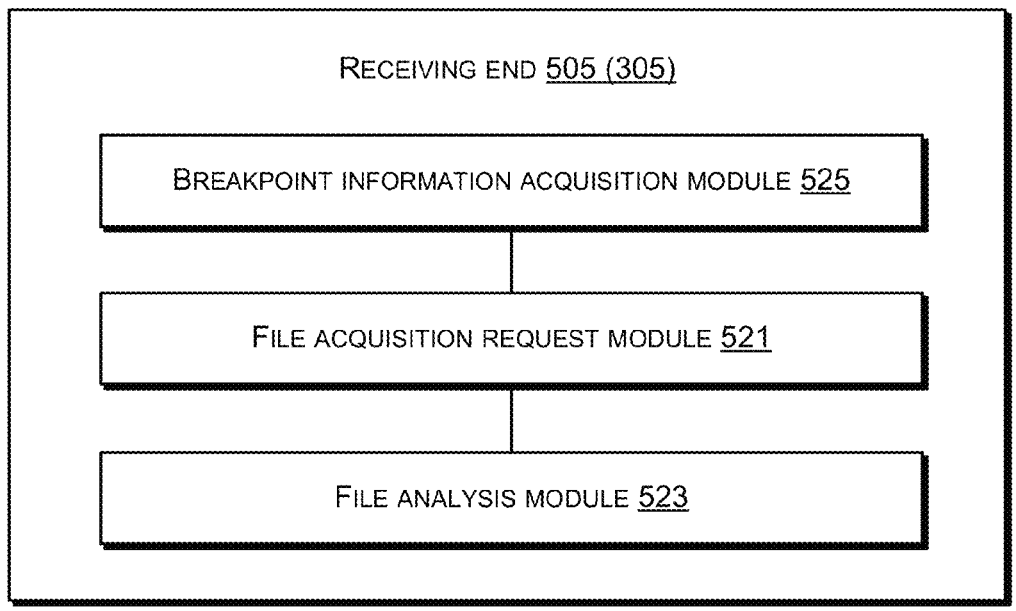
FIG. 5 shows a structural diagram of a receiving end of the exemplary file folder transmission system of FIG. 3.

FIG. 5 shows a structural diagram of a receiving end of the exemplary file folder transmission system of FIG. 3. The receiving end 505 (305) includes a file acquisition request module 521, a file analysis module 523, and a breakpoint information acquisition module 525. The file acquisition request module 521 is used for sending a file acquisition request to the sending end 301. The file acquisition request is based on a directory structure file, and formed after the receiving end 305 has received and analyzed the directory structure file. The file analysis module 523 is connected with the file acquisition request module 521, and is used for analyzing whether files in the file folder to be transmitted exists in a receiving directory of the receiving end 305. The analysis is based on comparing the received directory structure file with the existing files stored at the receiving end. The file analysis module 523 sends the analysis result to the file acquisition request module 521 to form the file acquisition request.

The breakpoint information acquisition module 525 is connected with the file acquisition module 521, and is used for acquiring breakpoint information of transmission interruption of the directory structure file or the file folder. This may be done after a network connection between the receiving end 305 and the sending end 301 has disconnected and re-connected. The breakpoint information indicates a proper position in the directory structure file or the file folder at which the transmission should be resumed when the network connection has recovered. The breakpoint information acquisition module 525 sends the breakpoint information of transmission interruption to the file acquisition request module 521, which forms the transmission request accordingly to ensure that transmission of the directory structure file or the file folder resumes from a position indicated by the breakpoint information.

In an exemplary application of file folder transmission using the file folder transmission system 300, the sending end 301 first selects a file folder to be transmitted. Upon clicking a button for sending the file folder, the file folder transmission unit 303 starts the directory management module 411. The directory management module 411 starts a statistics thread and traverses the directory structure of the selected file folder to analyze the files and the file and folder structures in the selected file folder. At the same time, the directory management module 411 computes space (size) the file folder occupies in a disk, the path and path lengths of the files, the sub-file folders and sub-files in the file folder, and generates a directory structure file. Table 1 shows an exemplary format of a directory structure file in accordance with the present disclosure:

TABLE 1

| | |
|---|---|
| WORD | // directory path length |
| String | // directory path |
| WORD | // path length of file 1 under directory |
| String | // path of file 1 under directory |
| WORD | // path length of file 2 under directory |
| String | // path of file 2 under directory |
| ....... | |
| WORD | // path length of last file under directory |
| String | // path of last file under directory |
| WORD | // path length of sub-directory 1 |
| String | // path of sub-directory 1 |
| WORD | // path length of file 1 under sub-directory 1 |
| String | // path of file 1 under sub-directory 1 |
| ....... | |

The sizes of a file folder and a file in the file folder may be saved as a 64-bit integer. A maximum amount of data in a file folder that can be transmitted may be set to be $2^{34}$ GB, for example. Alternatively, a cap for the size of an individual file folder to be transmitted may be set. File folders with a size below or equal to the cap may be transmitted directly using the translation method described herein. Any file folder with a size above the cap may still be transmitted, but may be required to use a file relay server, thereby lowering operating cost.

The directory structure file thus generated may be identified using an index file. For example, upon traversing the file folder, the sending end 301 extracts a 16-bit hashcode from the generated directory structure file using a message digest algorithm such as md5 algorithm. The 16-bit hashcode works as a unique identifier of the directory structure file.

Prior to file folder transmission, the sending end 301 may first send a file folder transmission request to the receiving end 305 through a messaging communication channel (such as communication tools like QQ). If the receiving end 305 degrees to the transmission of the file folder, the sending end 301 calls the network transmission module 413 in the file folder transmission unit 403 (303), and establishes a designated network data transmission channel. The network data transmission channel may either be a P2P (peer-to-peer networking) transmission channel, or a relay channel of a server, depending on network conditions of the sending end 301 and the receiving end 305. A designated network data transmission channel allows faster and safer file folder transmission.

After the network data transmission channel has been established, the sending end 301 first sends the hashcode of the directory structure file to the receiving end 305 through the network data transmission channel. Upon receiving the hashcode of the directory structure file, the receiving end 305 examines whether the hashcode of the directory structure file exists in a directory arranged for this purpose. If the hashcode of the directory structure file does not exist, the sending end 301 transmits the directory structure file to the receiving end 305 through the network data transmission channel.

Upon receiving the directory structure file from the sending end 301, the receiving end 305 first determines whether the receiving directory arranged for storing the file folder meets the disk space requirement for storing the file folder, and whether any path length of the sub-file folders and sub-files in the file folder exceeds the path length limit of the operating system of receiving end 305. If the requirements are satisfied, the file analysis module 523 analyzes whether the any files in the file folder already exist in the receiving directory of the receiving end 305, and sends an analysis result to the file acquisition request module 521. Based on the analysis result obtained by the file analysis module 523, the file acquisition request module 521 forms an acquisition request and sends it to the sending end 301. The acquisition request specifies files in the file folder that do not already exist in the receiving directory and therefore need to be transmitted. The sending end 301 then transmits the requested files in the file folder to the receiving end 305 according to the acquisition request.

In addition to the file paths and filenames, timestamps may also be used to further identify different versions of the same file. The file acquisition request may indicate that a newer version of a file needs to be transmitted even though an older version of the file already exists in the receiving directory of the receiving and 305.

If a network connection between the sending end 301 and the receiving end 305 has had an interruption and was disconnected and re-connected in the process of transmission of a file folder, the breakpoint information acquisition module 525 in the receiving end 305 acquires breakpoint information of transmission interruption of the file folder. The breakpoint information indicates the position of transmission of the file folder at the time when the network was disconnected. The breakpoint information acquisition module 525 sends the breakpoint information to the file acquisition request module 521, which then sends a file acquisition request to the sending end 501 based on the breakpoint information. The breakpoint information ensures that the transmission of the file folder will start from a proper position indicated by the breakpoint information. If a network connection between the sending end 301 and the receiving end 305 was disconnected and re-connected in the process of transmission of a directory structure file, the breakpoint information acquisition module 525 may also acquire breakpoint information of transmission interruption of the directory structure file. The backbone information is likewise sent to the sending end 301 by the receiving end 305 to ensure that the transmission of the directory structure file will begin from a proper position indicated by the breakpoint information.

The present disclosure further provides an apparatus for file folder transmission. The structure and functions of the apparatus for file folder transmission are the same as the file folder transmission unit 403 (303) in the above file folder transmission system, and are therefore not described here again. In the present description, a "unit" may be a device, a tool or machine designed to perform a particular task or function. A unit or device can be a piece of hardware, software, a plan or scheme, or a combination thereof, for effectuating a purpose associated with the particular task or function.

The present disclosure further provides a method for file folder transmission. Exemplary embodiments of the method are described in detail below using flowcharts of processes. In this description, the order in which a process is described is not intended to be construed as a limitation, and any number of the described process blocks may be combined in any order to implement the method, or an alternate method.

Figure 6:
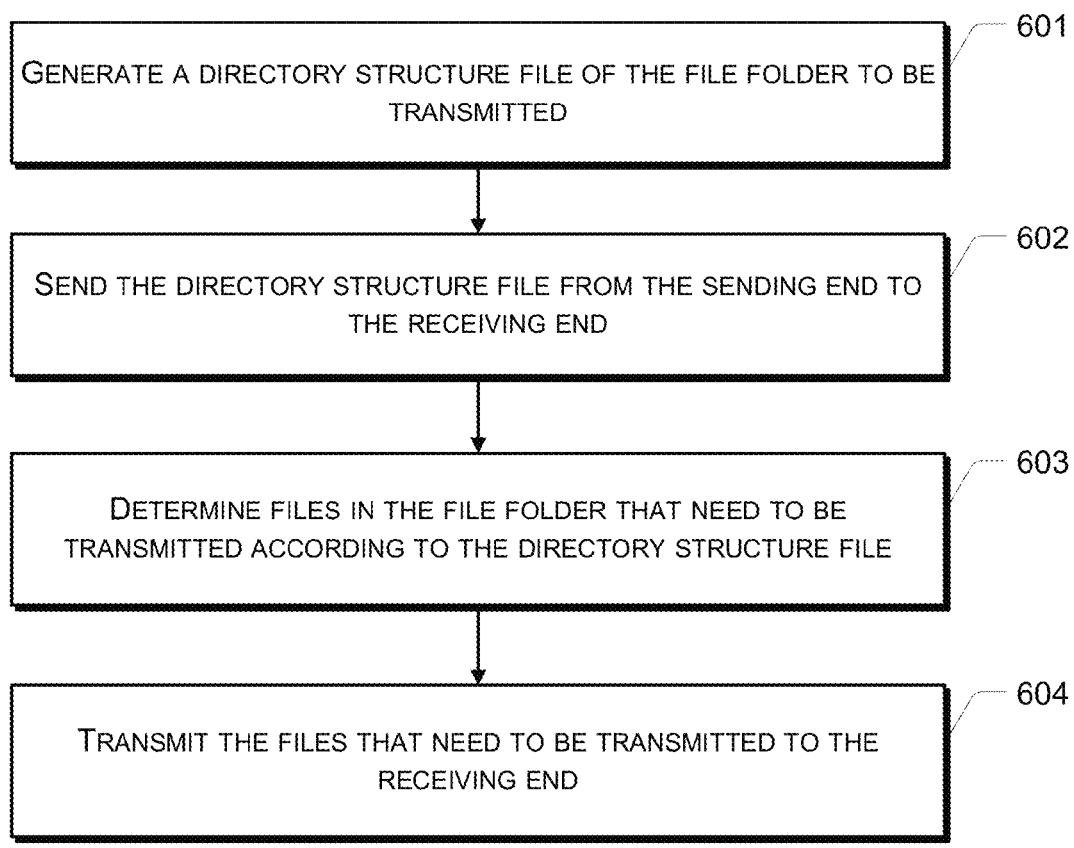
FIG. 6 shows a flow chart of an exemplary method for file folder transmission in accordance the present disclosure.

FIG. 6 shows a flow chart of an exemplary file folder transmission method in accordance the present disclosure. The exemplary process for file folder transmission includes the following procedures.

Block S601 generates a directory structure file of the file folder. The directory structure file has properties including size of the file folder, paths and path lengths of files in the file folder. The properties of the directory structure file may further include sizes of subfolders in the file folder and paths and path lengths of files in the subfolders. The directory structure file may be generated by traversing the file folder and computing the properties of the directory structure file. TABLE 1 shows an exemplary format for the directory structure file.

Sizes of a file folder and a file in the file folder are described using 64-bit integers. A maximum amount of data transmission for a file folder may be set (e.g., $2^{34}$ GB). Alternatively, a cap for the size of a file folder may be set.

Block 602 sends the directory structure file from the sending end to the receiving end.

Before transmitting the directory structure file, the sending end may send a file folder transmission request to a receiving end through a messaging communication channel, such as an instant messaging communication tool.

Before transmitting the directory structure file, the receiving end may also first determine whether the receiving end already has the directory structure file. An exemplary way to determine whether the receiving end already has the directory structure file is to use an index identifier as described herein.

In order to facilitate the transmission of the directory structure file and the subsequent transmission of the file folder, a network data transmission channel may be established according to network conditions of the sending end and a receiving end. The network data transmission channel may either be a P2P (peer-to-peer networking) transmission channel, or a relay channel of a server, depending on network conditions of the sending end and the receiving end. A designated network data transmission channel allows faster and safer file folder transmission.

Upon receiving the directory structure file from the sending end, the receiving end may first determine whether a receiving directory arrange for storing the file folder meets the space requirements of the file folder to occupy the disk, and whether any path length of the sub-file folders and sub-files in the file folder exceeds the path length limit of the operating system of the receiving end. If the requirements are met, the method may proceeds to the next step.

Block 603 determines the files in the file folder that need to be transmitted from the sending end to the receiving according to the directory structure file. The determination may be done by analyzing the directory structure file at the receiving end. For example, the receiving end may compare the directory structure file with files already stored in the receiving directory at the receiving end to determine which files need to be transmitted. After this, the receiving end may send a file acquisition request to request the files that need to be transmitted.

Block 604 transmits the files in the file folder that need to be transmitted to the receiving end. Upon an occurrence of a network connection interruption, breakpoint information of transmission interruption of the directory structure file or the file folder may be obtained in order to assure that the transmission resumes from a position indicated by the breakpoint information.

Figure 7:
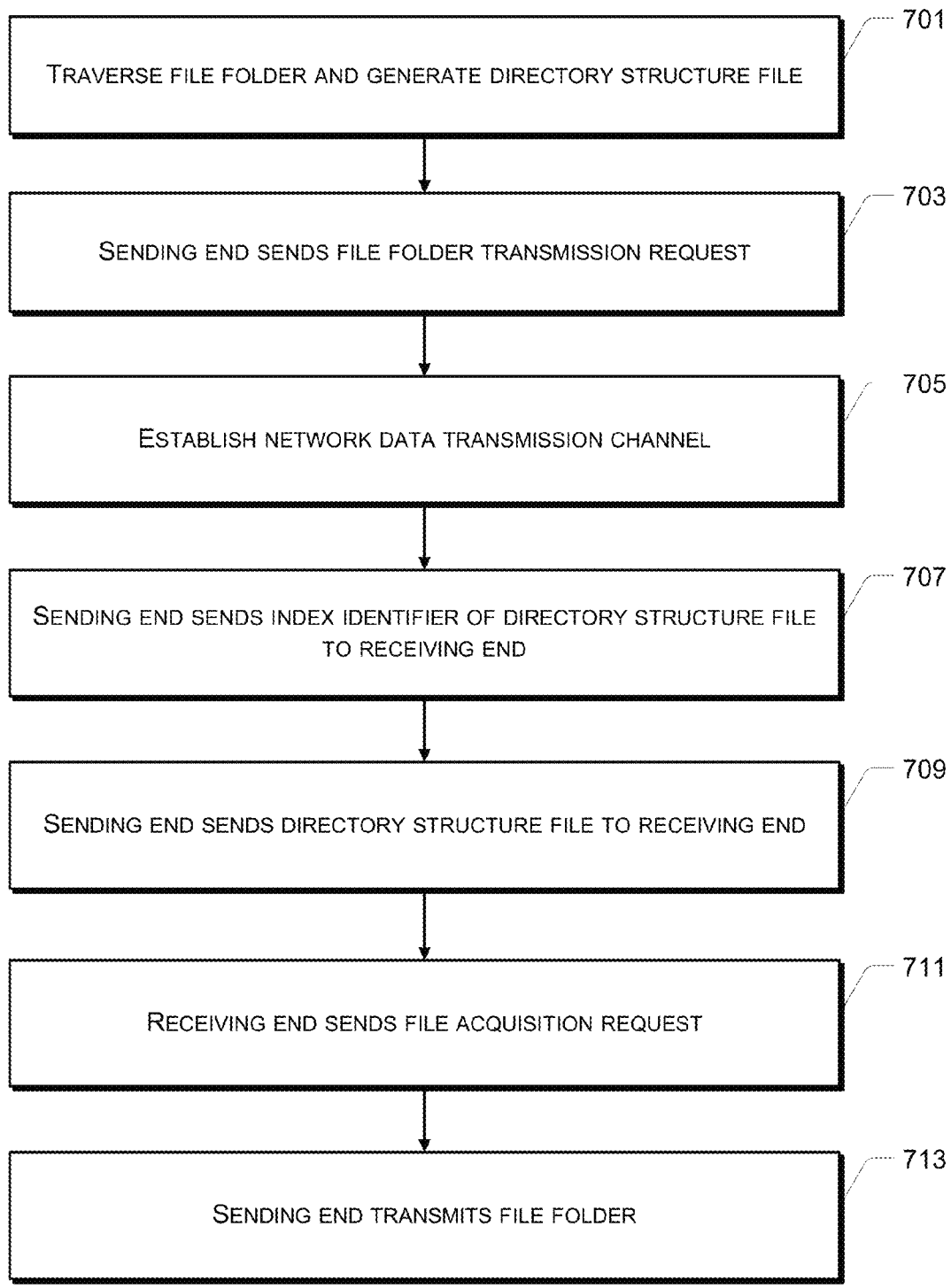
FIG. 7 shows a flow chart of another exemplary method for file folder transmission.

FIG. 7 shows a flow chart of another exemplary file folder transmission method in accordance with the present disclosure.

At block 701, the system traverses files in a file folder to be transmitted by a sending end, and computes the size of the file folder, paths and path lengths of sub-file folders and sub-files in the file folder to generate a directory structure file that indicates. TABLE 1 shows an exemplary format for the directory structure file.

At block 703, the sending end sends a file folder transmission request to a receiving end through a messaging communication channel such as an instant messaging communication tool. The available instant messaging communication tools include QQ, MSN and AliWangWang.

At block 705, if the receiving end agrees to the file folder transmission request, a network data transmission channel is established according to network conditions of the sending end and a receiving end. The network data transmission channel may either be a P2P (peer-to-peer networking) transmission channel, or a relay channel of a server, depending on network conditions of the sending end and the receiving end. The designated network data transmission channel allows faster and safer file folder transmission.

Block 707 sends an index identifier of the directory structure file to the receiving end through the network data transmission channel, and determines whether the directory structure file already exists at the receiving end. The index identifier may be a 16-bit unique identifier (hashcode) extracted from the directory structure file using a message digest algorithm such as md5 algorithm. Upon receiving the hashcode of the directory structure file, the receiving end examines whether the hashcode of the directory structure file already exists in a pre-agreed directory. Existence of the same hashcode indicates that the receiving end has already deceived the directory structure file.

At 709, if the hashcode of the directory structure file does not exist in the pre-agreed directory of the receiving end, the sending end transmits the directory structure file to the receiving end through the network data transmission channel.

At 711, upon receiving and analyzing the directory structure file, the receiving end sends a file acquisition request to the sending end. The file acquisition request is formed based on the result of analyzing the directory structure file.

For example, upon receiving the directory structure file from the sending end, the receiving end first determines whether a receiving directory for storing the file folder meets the size (space) requirement for storing the file folder, and whether any path length of the sub-file folders and sub-files in the file folder exceeds path length limit of the receiving end's operating system. If requirements are met, the receiving end analyzes whether any files in the file folder already exist in the receiving directory of the receiving end. Based on the analysis result, the receiving end of forms an acquisition request and sends it to the sending end. The acquisition request indicates the files that do not already exist in the receiving directory and therefore need to be transmitted.

At 713, the sending end transmits the files in the file folder to the receiving end through the network data transmission channel according to the received file acquisition request.

The method for file folder transmission in the present disclosure may also adopt a mechanism of breakpoint retransmission. If a network connection between a sending end and a receiving end was disconnected and re-connected, breakpoint information of transmission interruption may be obtained. The breakpoint information defines a point in the data being transmitted (either a directory structure file or a file folder) at the time when the network is disconnected. The breakpoint information ensures that the transmission of the directory structure file or the file folder will start from the proper position as indicated by the breakpoint information.

Figure 8:
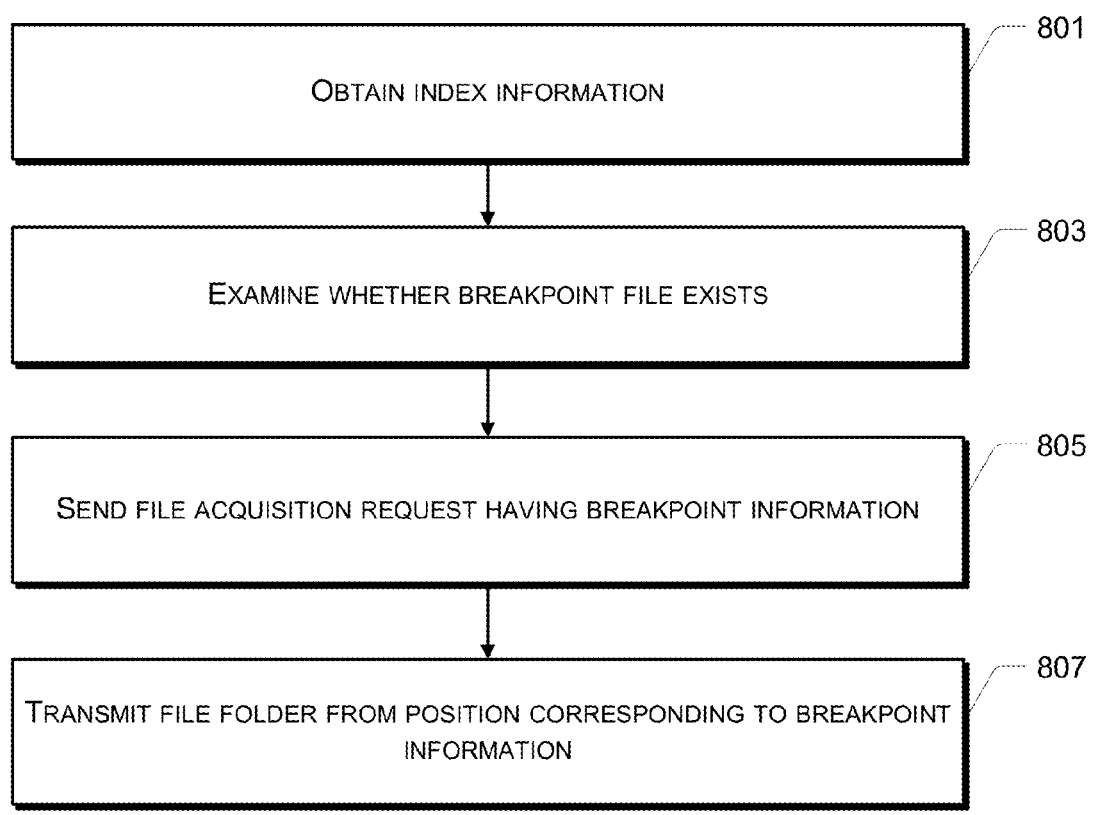
FIG. 8 shows a flow chart of an exemplary file folder transmission upon an interruption of the network connection between a sending end and a receiving end.

FIG. 8 shows a flow chart of an exemplary file folder transmission after the network connection between a sending end and a receiving end was disconnected and re-connected.

At block 801, the receiving end obtains file digest information from the sending end.

At block 803, the receiving end examines whether a file with a breakpoint exists based on the file digest information, and obtains breakpoint information if such a file exists.

At block 805, the receiving end sends a file acquisition request including the breakpoint information to the sending end.

At block 807, the sending end transmits the file folder starting from a position indicated by the breakpoint information.

Using a file folder transmission unit for file folder transmission, the disclosed method may require only a simple one-click operation to achieve transmission of a file folder between a sending end and a receiving end. In addition to simplicity and convenience in operation, the disclosed method also avoids the drawback of high occupancy of system resources caused by zipping and compressing a file folder. Furthermore, the disclosed method and system can be used with a breakpoint resume mechanism for transmission. Under poor network conditions, or when a network connection has been dropped for whatever reason, the disclosed method and system allow a fast recovery to previous transmission status upon re-connection, resulting in a more stable and reliable file folder transmission.

Implementation Environment

It is noted that the disclosed method and system can be implemented using hardware only, but preferably should be implemented using a combination of software and hardware. The disclosed method itself can be implemented in the form of software products stored in a storage media. The software includes instructions for a computer device (either stand-alone or networked) to execute the method described in the exemplary embodiments of the current disclosure.

In particular, the above-described techniques may be implemented with the help of a computing device, such as a server or a personal computer (PC). A computing device may include processor(s), I/O devices, computer readable media, and a network interface. The computer device can be connected to a client-side or a server-side. A client-side computing devices may each be a computer or a portable device, used as a user terminal.

The computer readable media may store application program modules and data. Application program modules contain instructions which, when executed by processor(s), cause the processor(s) to perform actions of a process described herein (e.g., the illustrated process of FIGS. 5-7). An exemplary process that can be performed by executing instructions stored in computer readable media is as follows:

generate a directory structure file of the file folder, the directory structure file having properties including size of the file folder, paths and path lengths of files in the file folder;

send the directory structure file from the sending end to the receiving end;

determine files in the file folder that need to be transmitted from the sending end to the receiving according to the directory structure file; and transmit the files in the file folder that need to be transmitted to the receiving end.

It is appreciated that the computer readable media may be any of the suitable storage or memory devices for storing computer data. Such storage or memory devices include, but not limited to, hard disks, flash memory devices, optical data storages, and floppy disks. Furthermore, the computer readable media containing the computer-executable instructions may consist of component(s) in a local system or components distributed over a network of multiple remote systems. The data of the computer-executable instructions may either be delivered in a tangible physical memory device or transmitted electronically.

It is appreciated that the potential benefits and advantages discussed herein are not to be construed as a limitation or restriction to the scope of the appended claims.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method to reduce file folder compressing resources, the method comprising:
   generating a directory structure file of the file folder by traversing the file folder and computing properties of the directory structure file, the properties of the directory structure file including a size of the file folder, paths and path lengths of files in the file folder;
   sending an index identifier of the directory structure file of the file folder to a receiving end through an instant messaging channel, the index identifier enabling the receiving end to determine whether the receiving end has the directory structure file;
   sending the directory structure file to the receiving end in an event that the receiving end does not have the directory structure file;
   receiving a file acquisition request from the receiving end, the file acquisition request indicating one or more files in the file folder requested by the receiving end; and
   transmitting the one or more files in the file folder to the receiving end through a network data transmission channel which is different from the instant messaging channel.

2. The method of claim 1, wherein the properties of the directory structure file further comprise one or more of a size of a subfolder in the file folder, paths of files in the subfolder and path lengths of the files in the subfolder.

3. The method of claim 1, further comprising sending a file folder transmission request to the receiving end through the instant messaging channel.

4. The method of claim 1, further comprising establishing the network data transmission channel based on network condition with the receiving end.

5. The method of claim 1, further comprising:
   obtaining breakpoint information of an interruption of a transmission of the directory structure file or the file folder in response to an occurrence of an interruption of a network connection with the receiving end; and
   resuming the transmission from a position indicated by the breakpoint information after the network connection is recovered.

6. One or more storage devices storing executable instructions that, when executed by one or more processors, cause the one or more processors to perform acts comprising:
   generating a directory structure file of a file folder by traversing the file folder and computing properties of the directory structure file, the properties of the directory structure file including a size of the file folder, paths and path lengths of files in the file folder;
   sending an index identifier of the directory structure file of the file folder to a receiving end through an instant messaging channel, the index identifier enabling the receiving end to determine whether the receiving end has the directory structure file;
   sending the directory structure file to the receiving end in an event that the receiving end does not have the directory structure file;
   receiving a file acquisition request from the receiving end, the file acquisition request indicating one or more files in the file folder requested by the receiving end; and
   transmitting the one or more files in the file folder to the receiving end through a network data transmission channel.

7. The one or more storage devices of claim 6, wherein the properties of the directory structure file further comprise one or more of a size of a subfolder in the file folder, paths of files in the subfolder and path lengths of the files in the subfolder.

8. The one or more storage devices of claim 6, the acts further comprising sending a file folder transmission request to the receiving end through the instant messaging channel.

9. The one or more storage devices of claim 6, the acts further comprising establishing the network data transmission channel based on network condition with the receiving end.

10. The one or more storage devices of claim 6, the acts further comprising:
    obtaining breakpoint information of an interruption of a transmission of the directory structure file or the file folder in response to an occurrence of an interruption of a network connection with the receiving end; and
    resuming the transmission from a position indicated by the breakpoint information after the network connection is recovered.

11. An apparatus to reduce file folder compressing resources, the apparatus comprising:
    one or more processors;
    memory storing executable instructions that, when executed by the one or more processors, cause the one or more processors to perform acts comprising:
    generating a directory structure file of the file folder by traversing the file folder and computing properties of the directory structure file, the properties of the directory structure file including a size of the file folder, paths and path lengths of files in the file folder;

sending an index identifier of the directory structure file of the file folder to a receiving end through a messaging channel, the index identifier enabling the receiving end to determine whether the receiving end has the directory structure file;

sending the directory structure file to the receiving end in an event that the receiving end does not have the directory structure file;

receiving a file acquisition request from the receiving end, the file acquisition request indicating one or more files in the file folder requested by the receiving end; and transmitting the one or more files in the file folder to the receiving end through a network data transmission channel.

12. The apparatus of claim 11, wherein the properties of the directory structure file further comprise one or more of a size of a subfolder in the file folder, paths of files in the subfolder and path lengths of the files in the subfolder.

13. The apparatus of claim 11, the acts further comprising sending a file folder transmission request to the receiving end through the messaging channel.

14. The apparatus of claim 11, the acts further comprising establishing the network data transmission channel based on network condition with the receiving end.

15. The apparatus of claim 11, the acts further comprising:

obtaining breakpoint information of an interruption of a transmission of the directory structure file or the file folder in response to an occurrence of an interruption of a network connection with the receiving end; and resuming the transmission from a position indicated by the breakpoint information after the network connection is recovered.

* * * * *